(12) United States Patent
Robinson

(10) Patent No.: US 6,543,968 B2
(45) Date of Patent: Apr. 8, 2003

(54) SUBMERSIBLE CANAL BYPASS

(76) Inventor: Robert A. Robinson, P.O. Box 476, Indio, CA (US) 92202

(*) Notice: Subject to any disclaimer, the term of this patent is extended or adjusted under 35 U.S.C. 154(b) by 0 days.

(21) Appl. No.: 10/145,333

(22) Filed: May 13, 2002

(65) Prior Publication Data

US 2002/0172558 A1 Nov. 21, 2002

Related U.S. Application Data

(60) Provisional application No. 60/291,526, filed on May 16, 2001.

(51) Int. Cl.[7] ................................................. E02B 5/02
(52) U.S. Cl. ........................... 405/270; 405/84; 405/90; 405/104
(58) Field of Search ............................. 405/80, 84, 85, 405/86, 87, 88, 89, 90, 103, 104, 270, 83, 106, 107, 268

(56) References Cited

U.S. PATENT DOCUMENTS

| | | | | |
|---|---|---|---|---|
| 790,573 A | * | 5/1905 | Hicks | ........................... 405/104 |
| 1,984,802 A | | 12/1934 | Mallery | |
| 2,928,251 A | | 3/1960 | Waring | |
| 3,269,124 A | | 8/1966 | Leathers | |
| 3,744,255 A | * | 7/1973 | Jacobs et al. | .................. 405/84 |
| 3,772,891 A | * | 11/1973 | Raistakka | ...................... 405/83 |
| 4,319,859 A | * | 3/1982 | Wise | ........................... 405/268 |
| 4,954,019 A | * | 9/1990 | Giroux | ........................ 405/268 |
| 5,161,913 A | * | 11/1992 | Boylan | ......................... 405/83 |

* cited by examiner

Primary Examiner—Frederick L. Lagman
(74) Attorney, Agent, or Firm—Sheldon & Mak; Denton L. Anderson

(57) ABSTRACT

A submersible canal bypass is used to successively bypass the flow around distinct sections of an earthen canal for lining. The canal bypass is placed within the canal and uses a plurality of pipelines and a plurality of bulkheads assembled from portable modular sections. The headgates on the portable modular sections are so arranged along the bulkhead to divert the flow of water through bypass pipelines so as to isolate a section of the canal during lining activities and return the flow of water to the lined canal after lining.

20 Claims, 13 Drawing Sheets

SUBMERSIBLE CANAL BYPASS

Figure 1:
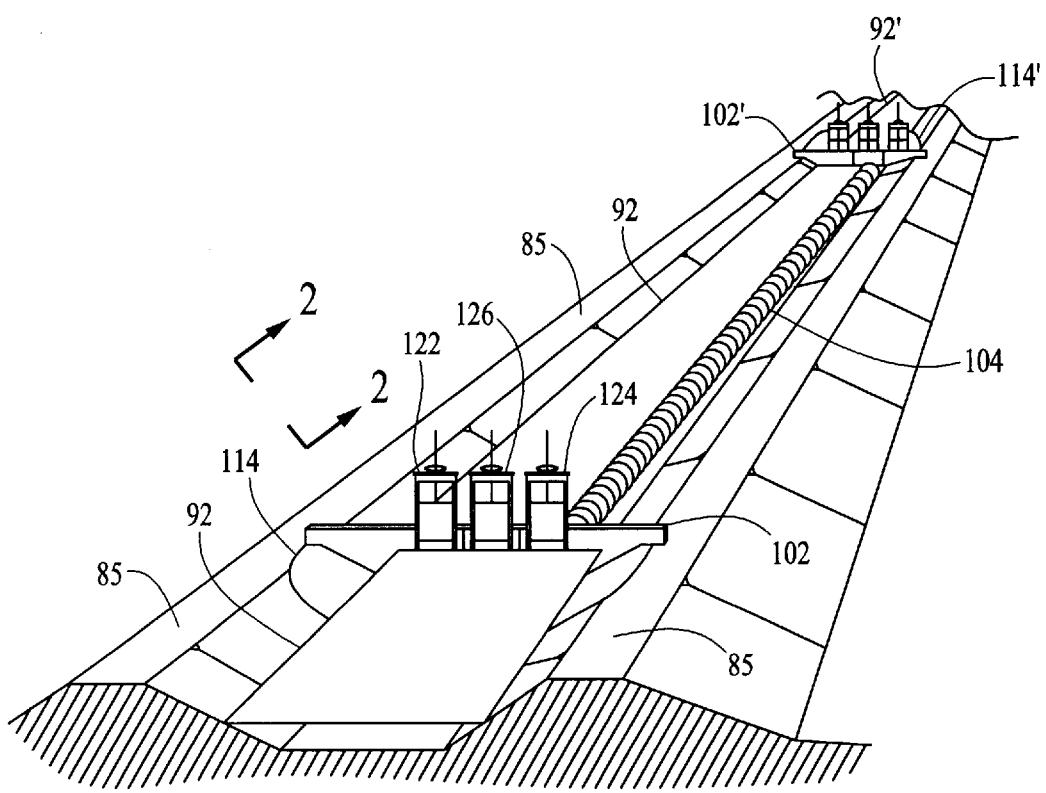

This application claims the benefit of Provisional application Ser. No. 60/291,526, filed May 16, 2001.

FIELD OF INVESTIGATION

This invention relates generally to canal bypasses and, more specifically to bypasses of earthen canals which cannot be taken out of operation for more than a few days.

BACKGROUND OF THE INVENTION

The movement of water from source, to point of use, has been an essential element of urban communities and irrigated agriculture since the beginning of time. Canal systems have been widely used for this purpose since the times of Romans and Incas. In arid regions in southwestern United States many older irrigation canals are formed with a compacted earth bottom and gradually sloping sides. In areas of porous materials, compacted earth canals have rates of seepage many times more than canals lined with an impermeable liner.

Over the last fifty years in the arid southwest, clean water has become more expensive to acquire, and the need for secure water containment has increased. During the same time, population increases have placed even heavier reliance upon existing canals systems, greatly reducing the opportunity for taking canals out of service, even for short periods of times.

The common action in the installation of a lining material is to dry out the canal and then quickly lay the impermeable lining. Engineers have tried almost everything to line their canals including clay, bricks, concrete, plastics, geomembranes and spray on chemicals. During the interim, water must be bypassed around the canal, or the community that depended upon the canal will be without water.

It is therefore the general object of the present invention to provide a method for bypassing water through a section of existing canal in order that the existing canal can be reconstructed in place; and lined one section at a time, while avoiding the cost and difficulty to secure a bypass corridor over lands not occupied by the canal such as in urban or environmentally sensitive areas.

A number of approaches have been used for bypassing water during the lining of a canal or waterway in arid regions.

One approach, is the use of pumps to pump water around the canal such as a recent bypass set-up for the Kern Water District in California. The AP Canal needed to be dry during the beginning of pre-irrigation due to the construction of the new Amtrak Railroad Station. In order to continue to supply its customers, it was necessary to transfer water from one canal to another at two different locations. The first location required a series of bypass pumps totaling 25 cfs and the second series of pumps totaling 35 cfs. This approach was effective but required eight pumps in simultaneous operation. At one location, a problem with debris plugged off the pump suctions necessitating a standing 24 hour pump watch. Albeit relatively small in size, the Kern Water District bypass illustrates some major drawbacks of a pumped bypass system. The drawbacks include: the need for additional room for bypass pipelines, prohibitively high capital cost, and unaffordable ongoing maintenance expenses.

Another approach is to physically construct a parallel canal such as was done in lining the first 49 miles of the Coachella Canal in California in 1980. The existing 123-mile Coachella Canal is a branch of the All-American Canal System conveying water to irrigate 78,530 acres in the Coachella Valley. Prior to 1980, the first 86 miles of the canal were unlined. Seepage losses along the first 49 miles averaged 132,000 ac-ft out of total annual diversions of approximately 500,000 ac-ft. The primary action taken to ensure continued supply of water while lining the Coachella Canal was the construction of a parallel replacement. Obvious drawbacks to this method include: additional right-of-way, and prohibitively expensive replacement of drop structures, siphons, and irrigation turnouts.

An alternative method which avoids the cost of additional right-of-way includes emptying the canal, quickly installing alternative lining materials, and refilling the canal. The most notable materials used, which have consistently failed over time are: woods of various types, asphalt, plastic, concrete or fiberglass. U.S. Pat. No. 3,996,715 to Dowse (1976) discloses a typical one piece building block so shaped as to allow a plurality of identical blocks to be interlocked forming a canal or river lining or for use as a permanent or temporary load bearing surface. Plastic or felt sheets have been proposed which are impregnated with asphalt of various types supposedly sealed to prevent the intrusion of water. Nevertheless in time, all of these methods for rapid installation of alternative lining materials have been found wanting. Wood rots, weeds displace and break apart interlocking concrete blocks, plastic tears, cracks occur in fiberglass, and asphaltic felt undergoes organic attack.

U.S. Pat. No. 1,984,802 to Mallery (1934) discloses a method for diverting the flow around a natural stream as a means for mining the streambed. The method employs conduits of flexible water proof material such as rubberized canvas, or cloth, connected to heavy front openings supported by a cable arraignment. The method has several inherent problems. Without a headwall, the erosive forces will remove soil near bottom and corners of the heavy front openings destabilizing the inlet. Because no provision is made to address the rotational thrust developed when flow is shifted to one side, the force will rotate each individual inlet. The magnitude of erosive and rotational forces will vary with varying water depth and will make sealing the assembly against leakage impractical or impossible when stream water depths exceed more than a few feet. Moreover, the invention requires a steep grade, commonly found in natural streams but absent in canals, to provide sufficient water pressure to maintain the dimensional stability of the conduits, to prevent lateral movement and surging after air pockets have formed due to entrained air, to prevent airlocking as air pockets collect together under a sagging pipe ceiling, and to prevent the collapse of lower conduits from the weight of upper conduits. Because canals have far flatter slopes, the necessary stabilizing water pressures are absent making the invention unsuitable. Finally, the invention is untenable as a canal bypass because no provisions are made for the orderly return of flow from the original stream bed back into another modified stream bed when all work is completed.

Numerous methods have been disclosed using bulkheads or headwalls to stabilize inlets for pipelines, culverts, canals, and rivers. The materials used have been: woods of various types, plastic, steel, concrete and fiberglass structures having an endless variety of shapes. U.S. Pat. No. 2,928,251 to Waring (1960) discloses a typical headwall for an irrigation lateral. The headwall has side and bottom edges which are embedded in the surrounding soil for the purpose of resisting thrust, lowering seepage and preventing erosion. However this headwall, like others in prior art, call for installation under relatively unsaturated conditions. Installation and removal under submerged conditions, particularly for large scale canals, present a whole array of new forces that must be addressed in order to maintain stability and prevent damage to the headwall or canal bed. For example the submerged installation of the Waring invention in a large flowing canal would be problematic because the invention is designed to function as a drop structure, and will do so while being lowered into the canal; introducing rotational forces on the invention, creating erosive forces on the canal bed and inducing disruptive hydrostatic forces within the foundation that are not present during installation under unsaturated conditions. Finally, no provisions are made for the orderly return of flow from the original canal back into another modified canal when all work is completed.

U.S. Pat. No. 3,269,124 to Leathers (1966) discloses a tunnel fishway which aids natural movement of fish through a dam. The invention comprises of a small headwall upstream in the river feeding a major dam. The headwall serves as a transition to a pipe conduit. The conduit runs from the headwall, underneath the dam and reservoir, to a downstream outlet. While the invention recognizes the advantages of a bulkhead and pipeline conduit for the movement of fish in a relatively natural flow pattern, the substantial construction of the headwall, dam, tunnel and outlet does not have the portability necessary for repetitive installation and removal required for lining a canal.

U.S. Pat. No. 4,954019 to Giroux (1990) discloses a novel approach to solving the problem of canal bypass by conducting the lining operation underwater through use of a large underwater trimming and paving machine. The trimming and paving machine spans the canal and lays down a combination of concrete and PVC while the canal continues in a free flowing condition. The invention is not obvious because construction proceeds under submerged conditions where the invention must address a whole array of new forces. A test of this machine was conducted on the Coachella Canal between Siphons 14 and 15 in 1990. A significant drawback for the underwater trimming and paving machine is the inability to place and compact additional fill material where needed.

Several differing types of theoretical bypasses have been proposed, for example the installation of sheet piling in parallel along the centerline of the canal alignment. Sheet piling is narrow interlocking strips of steel or plastic plate, which are hammered into place; extending down into the bottom of the canal and protruding up out of the water.

One side of the canal could be used while the other side of the canal is allowed to dry-up. The sheet pile method recognizes that a gravity flow bypass is more reliable than a bypass powered by electric or internal combustion engines.

The real life disadvantages to the sheet pile method are significant. The main difficulty is in limiting underflow seepage. The earthen canal, as long as it continues to transport water, will continue to lose water through seepage underflow passing through the canal bottom under the sheet pile and raising the water table on the other side. In order to control underflow, which creates saturated soil conditions making conventional earthwork and concrete lining activities impossible, well points will have to be installed along the length of the canal to dewater the canal subgrade sufficiently for earthwork to proceed. Finally, the sheet pile, once driven, is difficult to remove and relocate.

Accordingly, there is a need for a canal bypass in saturated soils, or submerged conditions, together with portability for repetitive installation, to quickly and reliably transport water around an existing canal which avoids the aforementioned problems in the prior art.

SUMMARY

The invention satisfies this need. The invention is a method for bypassing the flow of water an earthen canal to successively isolate and line distinct sections of the canal while remaining within the canal. The method comprises the steps of: (a) providing a plurality of portable modular sections; (b) installing portable modular sections such that the earthen canal is bifurcated by bulkheads upstream and downstream of the section to be isolated; (c) providing a plurality of pipelines whose length extends from upstream bulkhead to downstream bulkhead; (d) placing the pipelines in the canal; (e) attaching the pipelines to the bulkheads; (f) closing gates diverting the canal into the pipelines; (g) after the section is lined, opening gates diverting water into the lined section; (h) removing and repositioning the bulkheads and pipelines to the succeeding section of the canal to be lined.

The portable modular sections are each created by (i) providing a plurality of generally vertical walls and (ii) attaching a plurality of gates to each wall and (iii) assembling one or more vertical walls together in such a manner as to form a portable modular section.

The generally vertical walls of each portable modular section having been chosen so as to have sufficient height to extend down to sufficient depth to provide a water tight seal and to protrude above the water level plus the height required to extend above the lowest point of the surrounding canal banks, each of the plurality of portable modular sections being installed such that each portable modular section is in close proximity to a canal bank or to an adjoining portable modular section, such that one assembly of portable modular section forms a bulkhead which bifurcates the canal upstream of the section to be isolated and such that another assembly of portable modular sections forms a bulkhead which bifurcates the canal downstream of the section to be isolated In a typical embodiment, the bulkhead is comprised of three portable modular sections largely made of steel, each section containing a cast iron slide gate. The first section having a water tight mounting to connect to a single bypass pipeline largely made of steel. The second section having an open discharge, and the third section having a mounting to connect to a short pipeline.

DRAWING

In the drawings, closely related figures, such as mirror image bulkheads on the downstream end, are assigned the same drawing number but are denoted with a prime or double prime. The features aspects and advantages of the present invention will become better understood with regard to the following description, appended claims and accompanying figures where:

DETAILED DESCRIPTION

The basic form of the preferred embodiment is shown in FIG. 1 which has a flat bulkhead, or cofferdam, typically built up of steel plate. The bulkhead, or assembly of portable sections each being a part of the whole bulkhead, may be driven into the canal sufficient for a water tight seal or a weighted flexible seal, typically, polyethelyene or hypalon, may be used to seal the ends. The bulkhead provides the support for multiple gates, hereafter referred to as headgates, headgates can typically be slide gates, check gates, weir gates, leaf gates or butterfly valves or any combination. The bulkhead need not be perpendicular to the canal axis or water surface. The headgates need not be parallel to the bulkhead. In the basic form of the preferred embodiment, the bulkhead wall is perpendicular to the axis of the canal. In the preferred embodiment the basic material is steel, however the bulkhead, and headgates can be of any other material including sheet pile, corrugated steel, aluminum or reinforced concrete having sufficient mass and strength to extend to a typical depth 20 feet and to a typical width of 120 feet. Typical bulkhead thickness is 0.25 inches. The upstream bulkhead and downstream bulkhead assemblies are mirror images of each other and similar attachments are denoted with a prime, or double prime.

In FIG. 1, the bulkhead is installed in the existing earthen canal 85. Bypass pipeline 104 is shown connecting upstream bulkhead 102 to downstream bulkhead 102'. In the preferred embodiment the bypass pipeline material is corrugated metal pipe, attached with a water tight connection, such as a victaulic, to bypass headgate 124. The bypass pipeline can be of any other material including corrugated plastic or reinforced concrete having sufficient mass and strength to resist collapse when empty, and withstand rupture when full from a typical 16 feet of water pressure. Typical pipeline thickness is 0.25 inches. Typical length is 0.5 miles.

In the preferred embodiment Canal headgates 122, 124, and 126 are cast iron slide gates with steel frames and brass seals, however the headgates can be of any other type such as check gate, weir gate, leaf gate or butterfly valve. Headgates can be of any material including ductile iron, steel or plastic having sufficient mass and strength to maintain a leak tight seal to a typical water depth of 16 feet All headgates need not be of the same type or same material. Canal headgate 126 admits water directly into the canal. Transfer headgate 122 is connected to a removable mounting, such as a mount shaped to accommodate a victaulic connector, which can re-connect to a short section of pipe. Headgate 122 discharges to an erosion control pipeline for use in the switch over from bypass pipeline to lined canal. FIG. 1 shows all headgates in the open position so that water flows along both the earthen canal and the bypass pipeline. The open headgate position is denoted by an extended stem. Closed headgates are shown with a shorter stem. Section A—A is identified for a cross-sectional view of the earthen canal. The preferred embodiment shows one of each headgate, but multiple headgates of each type may be used. The preferred embodiment shows one bypass pipeline, but multiple bypass pipelines may be used.

Figure 2:
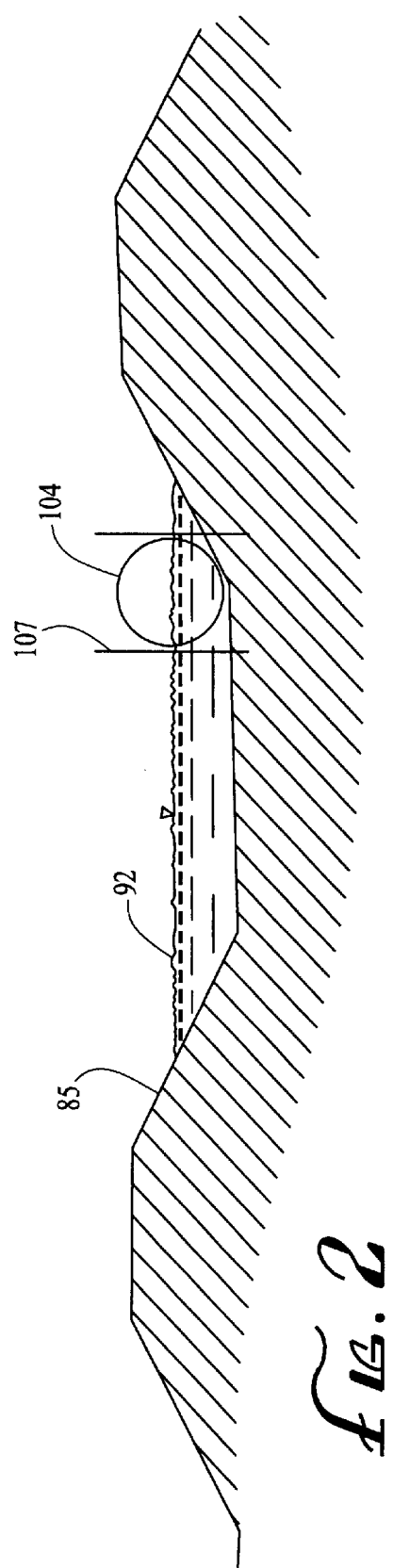

FIG. 2 shows a cross section of the earthen canal when all headgates are open and water flowing in both the canal 85 and bypass pipeline 104. Pipe supports 107, typically rods, angular steel, or "I" beams, or concrete posts, are driven into the canal bottom and are used to hold the bypass pipeline in-place.

Figure 3:
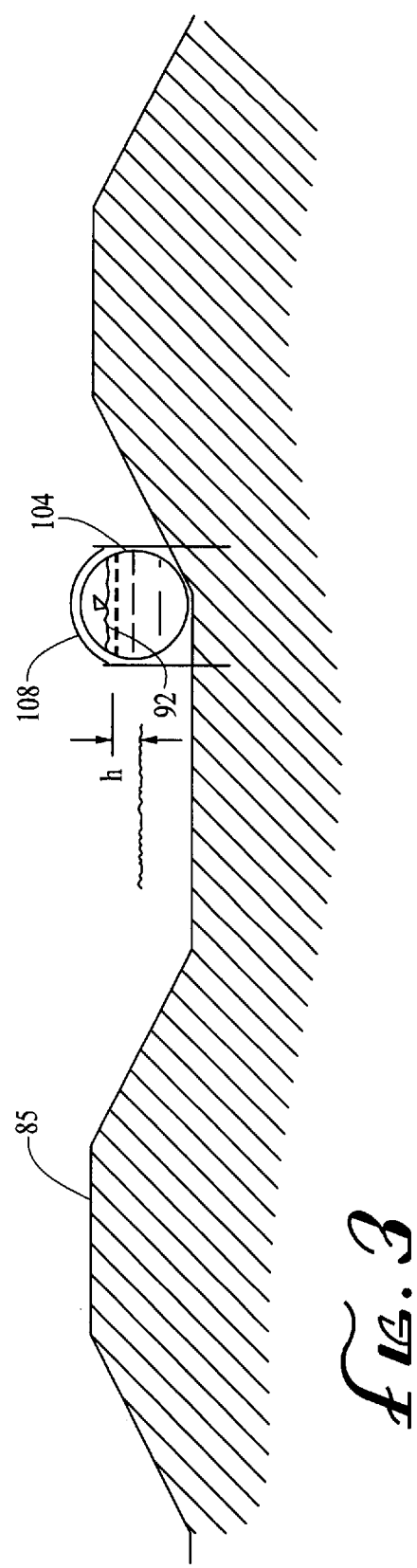

FIG. 3 shows a cross section of the earthen canal when the headgates are closed allowing water entry into the bypass pipeline only. The change in water surface elevation from the previous open canal flow to the closed pipeline flow is denoted by h. Alternative tie-downs 108 which may be used to restrain incidental movement are shown, typically tie-downs are of steel plate or steel cables but tie-downs can be of any material sufficiently strong to resist pipeline movement.

Figure 4:
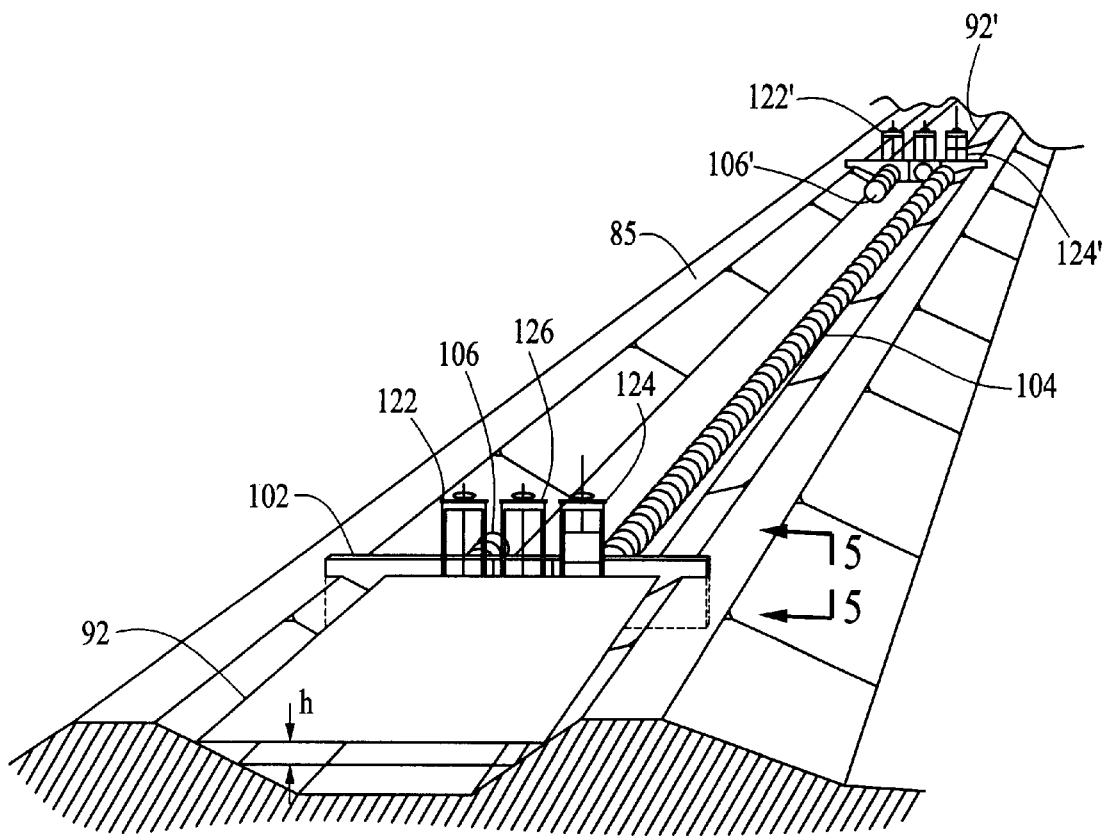

FIG. 4 shows the basic form of the preferred embodiment under bypass operation. The isolated section in the existing canal is dry. Erosion control pipeline 106 and 106' connected to transfer headgate 122 and 122', respectively, are visible. Headgates 124 and 124' are open. Headgates 122, 122', 126 and 126' are closed. The existing canal embankment has yet to be reconstructed. The rise in water surface elevation from the previous open canal flow is denoted by h. Section B—B is identified for a cross-sectional view of the bypass bulkhead in operation.

Figure 5:
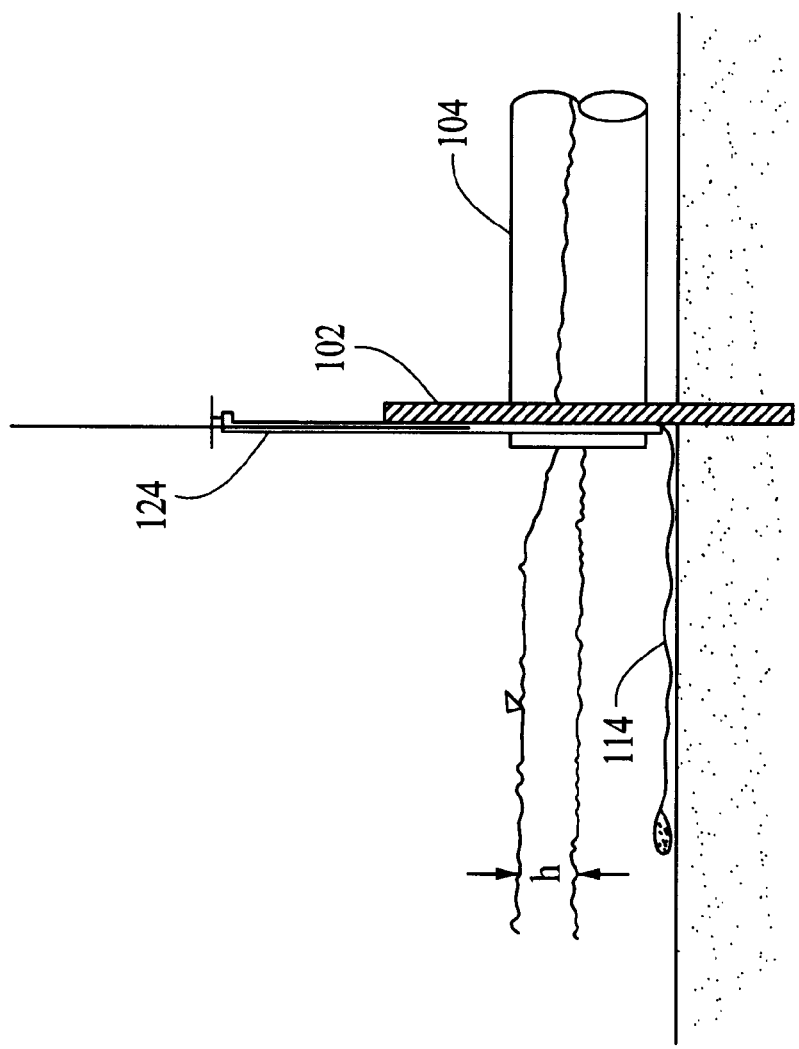

FIG. 5 shows a cross section of the bypass bulkhead where headgate 124 is opened, denoted by an extended valve stem, allowing water to enter bypass pipeline 104. The bulkhead may be driven into the canal sufficient for a water tight seal, or, a weighted flexible seal 114, typically polyethelyene, may be used to limit seepage, or a combination of both sealing methods may be used. The change in water surface elevation from the previous open flow conditions to the closed pipeline flow is denoted by h.

Figure 6:
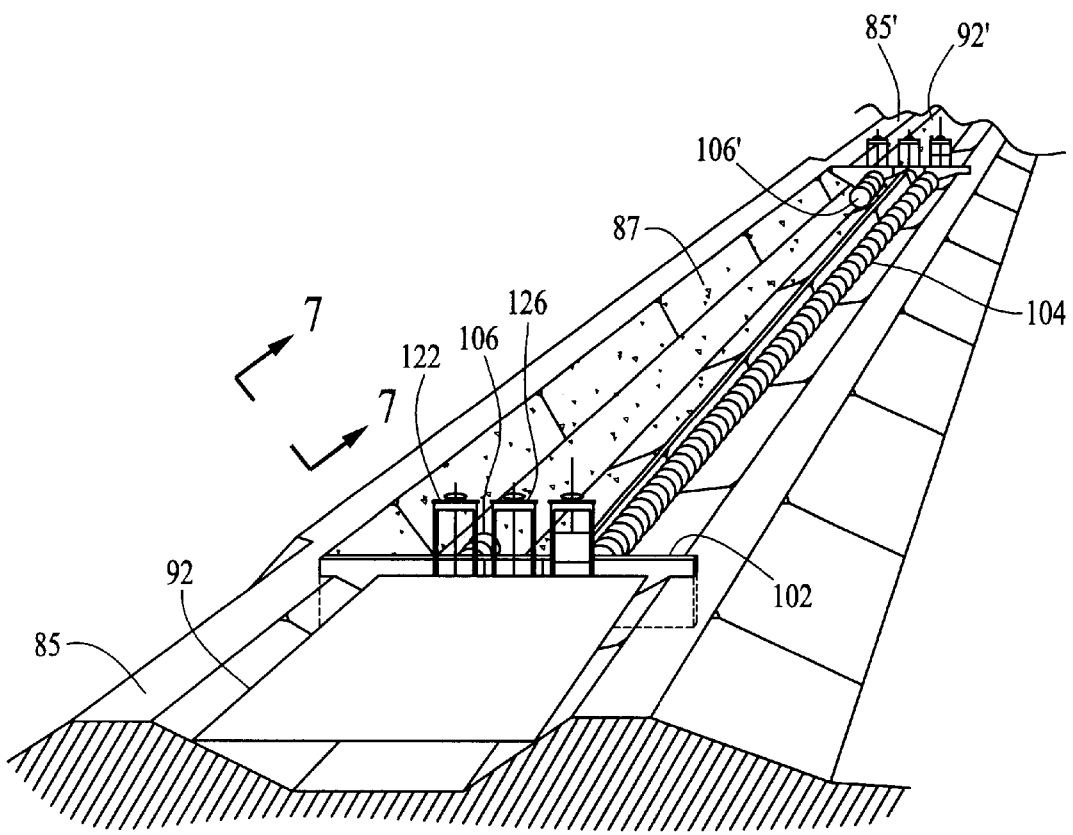

FIG. 6 shows the basic form of the preferred embodiment while the existing canal is being reconstructed prior to concrete lining. Transfer headgate 122 will be opened to redirect flow through erosion control pipeline 106 back into the canal upon completion of all work. Headgate 126 has been covered up during the reworking process and will not be opened. Section C—C is identified for a cross-sectional view of the reconstructed canal.

Figure 7:
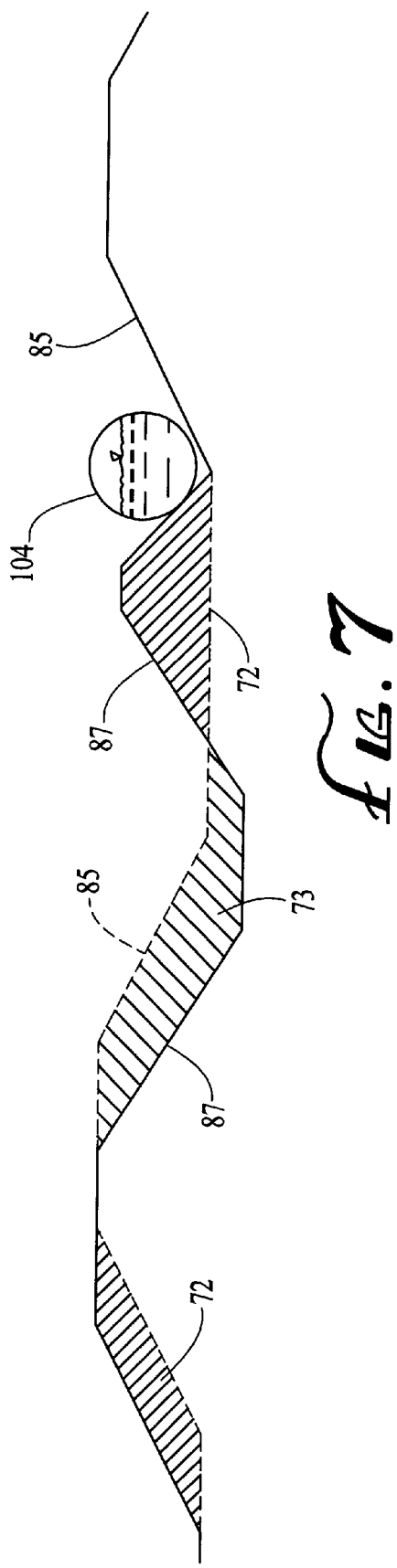

FIG. 7 shows a typical cross-section of the canal during reconstruction. Portions of the old canal cross-sections which are being modified are shown with a dashed line. During reconstruction, the side slopes are reconstructed from a typically moderately steep 2:1 side slope to a steeper 1½:1 slope. Typically, the bottom of the canal is lowered so that the overall depth of the canal is increased. Typically, unsuitable muck from the bottom of the canal is removed and remaining acceptable earth material is used for canal reconstruction. Typically the areas to be excavated 73 are balanced with the areas required for fill 72. Additional material needed for fill is taken from previous spoil piles (not shown) or trucked in. In the event that more material is excavated than is needed for fill, the excavated material may be left as a spoil pile (not shown.) After removal of the bypass pipeline, additional fill may be placed where the bypass pipeline used to be.

Comparison of the two U-shaped canal cross-sections discloses the hydraulics behind the invention. Canal banks of earthen canals 85 have flatter side slopes in order to maintain stability. Because earthen canals are irregular and may include nuisance vegetation, hydraulics demand a physically larger bottom width. Conversely canal banks of a lined canal 87 can have steeper side slopes. Steeper side slopes together with narrower bottom widths and deeper overall depth afford a more circular cross-section. With a more circular cross-section and a smoother, more regular surface, the laws of hydraulics determine that a lined canal can transport an equivalent amount of water within a smaller overall width. The invention capitalizes on the difference in physical widths between equivalent capacities of earthen and lined canal allowing the placement of both pipeline bypass and lined canal within the overall width of the original earthen canal.

Figure 8:
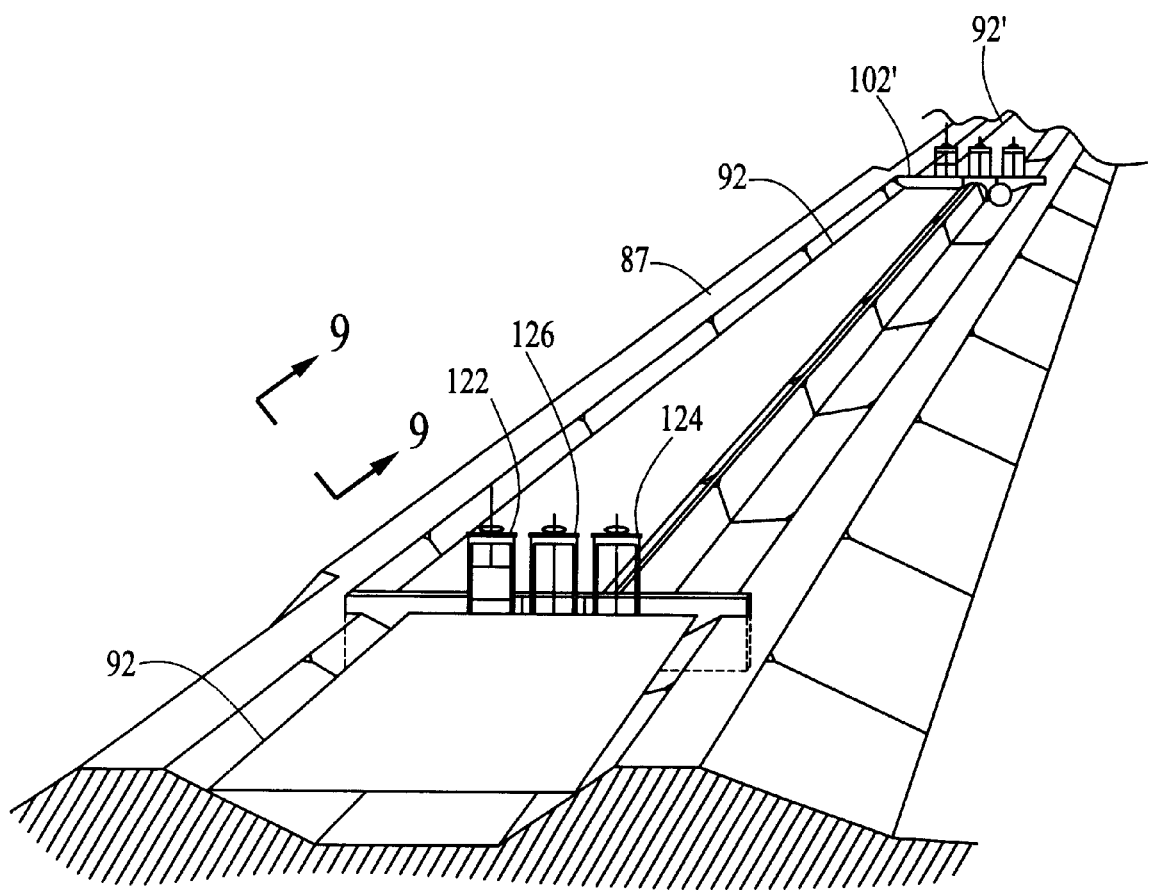

FIG. 8 shows the basic form of the preferred embodiment upon introduction of water into the lined canal (typically concrete) and after removal of the bypass pipeline. Transfer headgate 122 is shown in the open position and headgates 124 and 126 are closed. Section D—D is identified for a cross-sectional view of the newly lined canal in operation.

Figure 9:
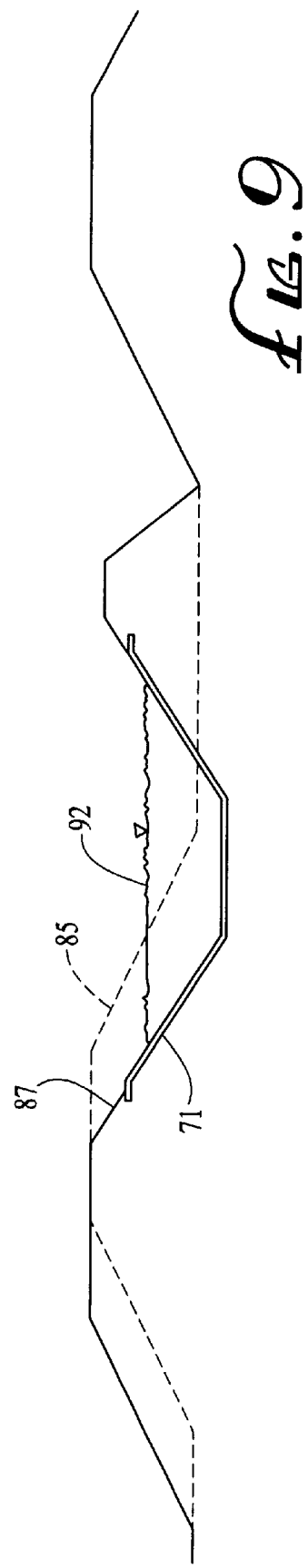

FIG. 9 shows a cross-section of the new canal with water flowing on a new lining 71. Superimposed on the new canal embankment 87 is the old canal bank of the original canal 85, shown with dashed lines for comparison.

Figure 10:
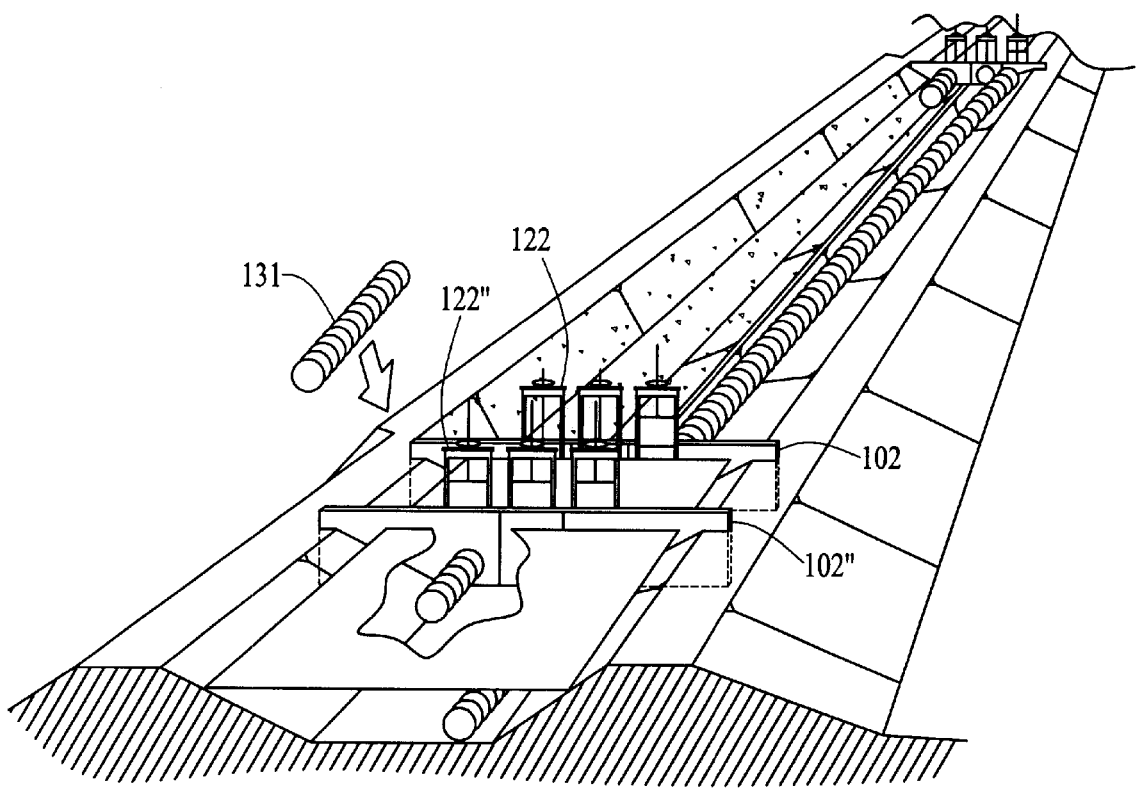

FIG. 10 shows a typical tie-in when the canal is being lined in multiple-stages. Shown is bulkhead 102" (of another pair of bypass bulkheads) installed immediately upstream of the current set. A tie-in pipeline 131 is installed after removal of transfer headgate 122" and transfer headgate 122 as indicated by the arrow, allowing the interval between bypass bulkheads to be dewatered and lined.

Figure 11:
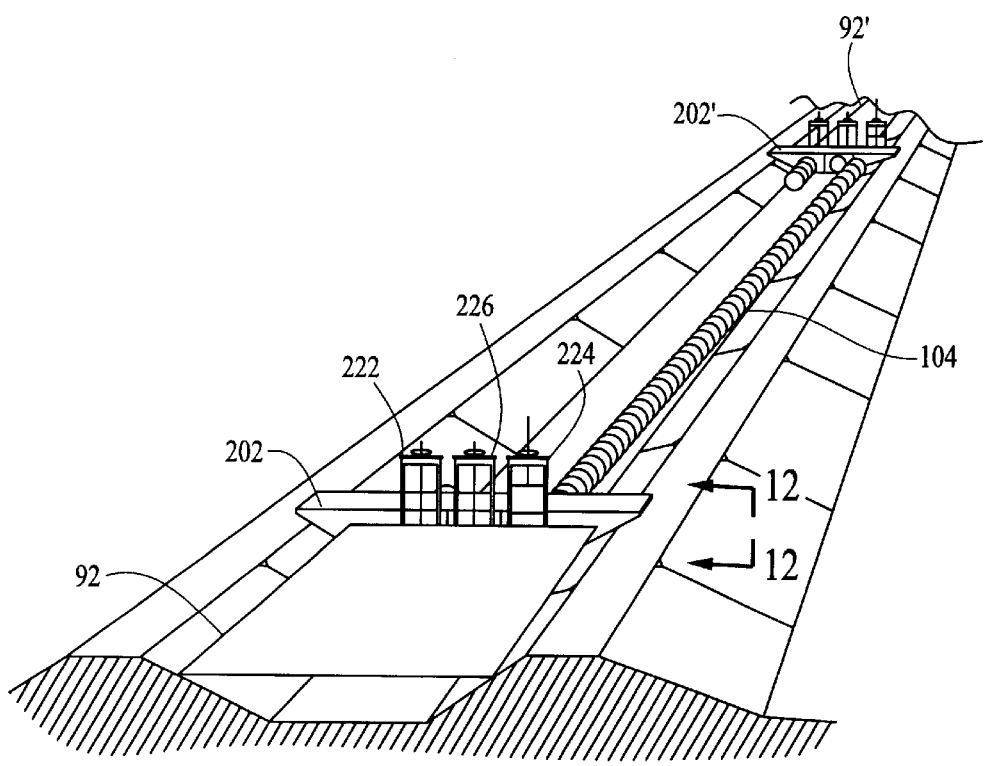

FIG. 11 discloses an alternative embodiment to the device where the bulkhead 202 is formed of earth, as in the case before, attaching to a corrugated metal bypass pipeline and headgates. Other types of built up bulkheads are equivalent. The bulkhead provides support for pipeline and multiple headgates, typical headgates can be slide gates, check gates, weir gates, leaf gates or butterfly valves or any combination. Section E—E is identified for a cross-sectional view of the alternative earth bulkhead in operation. Headgates 222 and 226 are shown closed. Bypass headgate 224 is shown open.

Figure 12:
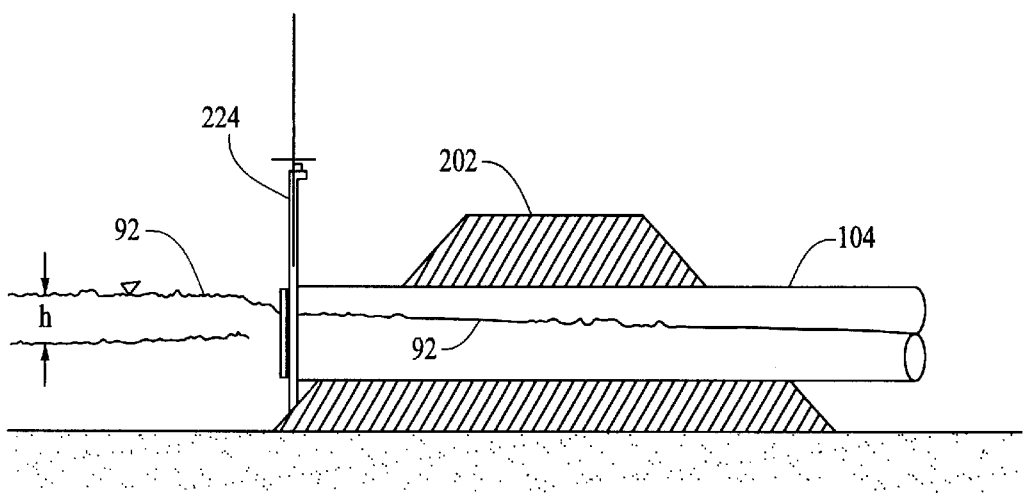

FIG. 12 shows a cross-section of earthen bulkhead 202 in operation with bypass headgate 224 open. The rise in water elevation necessary to move the water through the pipeline is shown by h.

Figure 13:
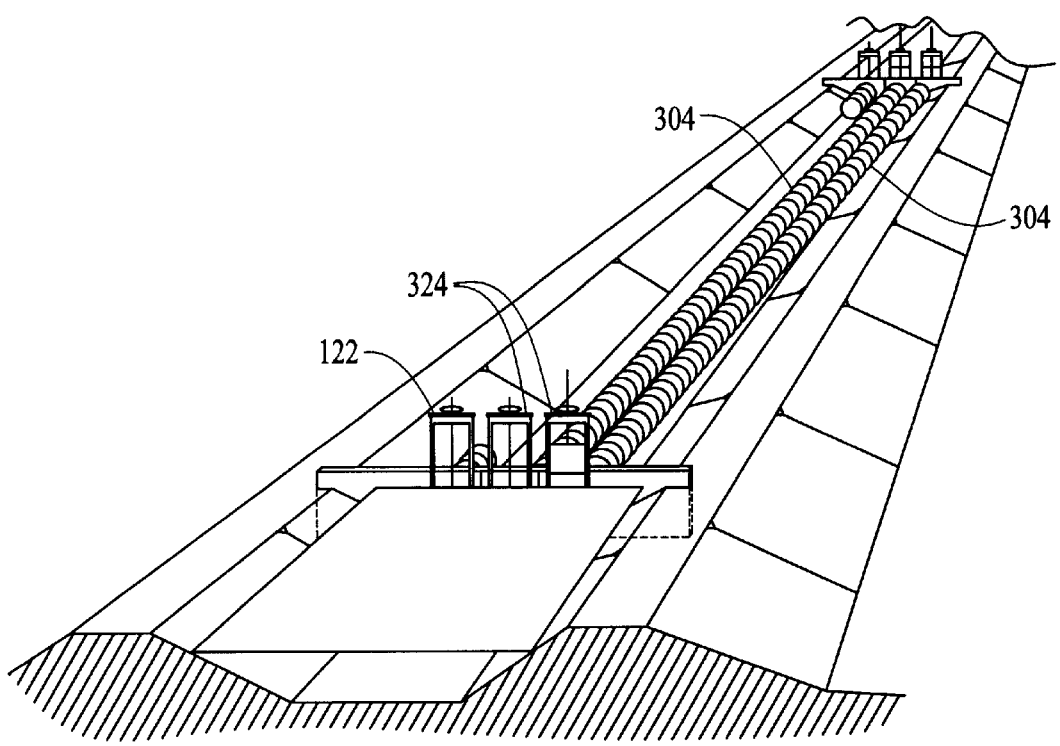

FIG. 13 discloses an alternative embodiment to the device where multiple bypass headgates 324 and multiple bypass pipelines 304 are used. The number of headgates and pipelines need not be limited to two in number and need not be the same diameter. A battery of multiple headgates and pipelines, typically ranging from 48-inch to 72-inch in diameter, are equivalent. Typical headgates can be slide gates, check gates, weir gates, leaf gates or butterfly valves or any combination.

Operation of a typical submersible canal bypass can be broken down into several distinct activities: assembly and installation, canal embankment reconstruction, and finally water transfer. The following case is the sequence of activities for a canal bypass bulkhead made from steel plate, a corrugated metal pipeline, and submerged assembly. Alternatively, the canal could be briefly lowered and assembly would proceed under a partially full canal or under saturated soil conditions.

The bypass pipeline 104 is assembled at the edge of the canal bank from short sections of bolted corrugated plate. Once the entire length of bypass is assembled it is rolled, floated, or lifted by crane, into the canal and anchored.

The steel canal bypass bulkhead 102 and pipeline 104 is constructed using standard welding and bolting methods. Prior to the installation of a bypass in any given section of the canal, the earthen banks of the canal are given a complete inspection for gopher holes and other defects. Gopher holes are plugged and defects repaired.

Bulkhead 102 is assembled in modular sections. Each modular section to be lifted and installed individually by a crane. Typical configuration would be comprised of three sections, each having a hole cut to receive a headgate, such as 124 and 126, which are positioned over the hole cuts and bolted into place. The bolting pattern on the modular section containing the victaulic mount for headgate 122 is compatible with the victaulic connection for transfer pipeline 131. Typically 10 ft of erosion control pipeline 106 is attached to the opposite side of the modular section supporting headgate 122.

Thereafter bulkhead 102 is installed in the canal by a crane lifting individual modular sections. The first section to be installed in the canal is the module having headgate 124 which must connect to bypass pipeline 104. Prior to landing the bulkhead 102 firmly in the canal invert, a series of floats and cables may be used to raise, and maneuver the end of bypass pipeline 104 for connection to the bulkhead. The preferred alternative uses victaulic connectors but flanged, restrained joint bell and spigot, or mechanical joint connectors are equivalent. Subsequent sections of the bulkhead are lifted by crane, landed in the canal and bolted together until a complete bulkhead extends across the canal.

In the event of misalignment between headgate 124 and bypass pipeline 104 a sheet pile or earth bulkhead maybe substituted for the steel bulkhead. Pipeline supports 107 and 108 are installed typically at 10 ft intervals.

For the steel bulkhead embodiment, plastic sheet 114 is folded over on one end, filled with sand for weight and installed to prevent nuisance leaks.

The same bulkhead assembly and installation process is repeated for the downstream bulkhead.

After installation of the bypass pipeline and bulkhead, bypass headgates 122 and 126 are partially closed to generate a head differential to verify the tightness of the water seal around the bulkhead. Bypass headgate 124 remains open and water is allowed to flow into canal bypass pipeline. Prior to full closure of headgates 122 and 126, water levels are lowered in the downstream section below bulkhead 102' of the canal to the maximum extent possible to allow the canal to drain by gravity. During closure of headgates 122 and 126, the water level in the earthen canal is raised to the elevation expected for water level rise under a pipeline bypass, typically 4 feet, and an inspection of the upstream canal is conducted for leaks. After verifying the integrity of the canal, and bypass pipeline, downstream headgates 122 and 126 are fully closed bypassing the canal. A net is pulled from the upstream bulkhead 102 to the downstream bulkhead 102' to move the entire fishery out of the canal section. After allowing the canal sufficient time to drain, headgates 122' and 126' are fully closed. Sump pumps are placed in the downstream end of the isolated section to fully de-water the canal. Muck and unacceptable material is removed from the canal bottom and sides. When dry, earthmoving equipment are used to rework the existing canal bank to form the new canal. Compacted fill is placed on a 1:1 slope adjacent to the bypass pipeline to the height necessary. Additional fill in the space occupied by the bypass pipeline will be placed upon removal of the bypass pipeline, if necessary.

Canal lining, typically concrete, is applied. After sufficient cure time, water is re-introduced into the newly lined canal by opening headgates 122 and 122'.

Existing control structures, or siphons, can greatly simplify the water transfer process. At existing control structures, or siphons, bulkheads can be constructed to match to existing dimensions of concrete inlet/outlet transitions. Removal of the two bulkhead completes the transfer process. In the event that the distance between existing structure is too long for a single bypass, two pairs of bulkheads and a more complex transfer operation is necessary. Typically the canal lining operation proceeds from the downstream section to the upstream section. After installing the lining in the downstream section of the canal. All headgates in the downstream pair of bulkheads (except downstream headgates 126 and 126') are opened allowing water to flow freely through both canal and bypass pipeline. The work then proceeds with installing a bypass for the upstream section, installing a second pair of bulkheads, herding the fishery downstream, reconstructing canal embankments, and canal lining, all as described previously. After completion of all canal lining work within the upstream pair of bulkheads, all headgates (except for upstream heagates 126 and 126') are opened allowing water to flow through both bypass pipelines and newly lined canals. Thereafter headgates 122 of the downstream pair of bulkhead and 122", as shown in FIG. 10, of the upstream pair of bulkhead are removed. Water levels in the downstream section of canal are lowered to the extent possible to allow all parts of the bypass to drain by gravity. Transfer pipeline 131 is installed connecting to the bulkheads of both newly lined canals. After allowing the bypass pipelines sufficient time to drain, bypass headgates are closed, and the area between bulkheads is dewatered using a sump pump. The earthen banks in the short section are reworked to the specifications required for lining, and the lining is applied.

After sufficient cure time, water is reintroduced. The bulkheads and pipeline are removed and transported to the next location.

From the description above, a number of advantages of the canal bypass bulkhead and pipeline become evident:

(a) The invention is a simpler conveyance system than a typical pumped bypass system. Typical pumped bypass operations use a battery of pumps, pipelines, and valves requiring large amounts of manpower to set-up and relocate. Pumps powered by internal combustion engines require thousands of gallons of fuel and periodic major overhauls. Pumps powered by electric power need high voltage lines, large transformers and are difficult to move. Both types of pumps must be manned or monitored 24 hours each day. In contrast, the canal bypass bulkhead and pipeline is powered by gravity.

(b) The invention can be constructed within the original canal without the expense required for grade preparation or vegetation removal required by pipelines external to the canal; thereby minimizing the construction and environmental mitigation costs for canal lining activities.

(c) The invention can operate in the event of a power failure and is less prone to failure due to plugging than a pumped bypass.

(d) Unlike external pumps and bypass pipelines, the invention can accommodate movement of fish without injury.

(e) The invention is modular providing for multiple installations at the same time.

Although the description above contains many specifications, these should not be construed as limiting the scope of the invention but as merely providing illustrations of some of the presently preferred embodiments of this invention. For example, the pipeline can be of other shapes, such as circular, oval, trapezoidal, triangular, etc.; the bulkhead need not be sectioned, or entirely one piece, but have a hinge in the center to fold up or unfold. The shape of the bulkhead could be convex similar to an arch dam, or corrugated, or individual sections or the entire bulkhead could be braced against water pressure. The bulkhead could be installed in vertical channel recesses afforded for stop logs, or gates, in existing structures. The bulkhead could be installed without headgates where the installation and removal of portions of sheet piling in front of open holes in the bulkhead could be substituted for the operation of headgates.

What is claimed is:

1. A method for bypassing the flow of water in an earthen canal to successively isolate and line distinct sections of the canal comprising the steps of
   (a) forming a plurality of portable modular sections by a method comprising the following steps:
      (i) providing a plurality of generally vertical walls and a plurality of gates;
      (ii) attaching a plurality of gates to each vertical wall; and
      (iii) assembling one or more generally vertical walls together in such a manner as to form a portable modular section; and
   (b) submersing and installing each portable modular section at individual predetermined locations in the canal, the generally vertical walls of each portable modular section having been chosen so as to have sufficient height to extend down to sufficient depth to provide a water tight seal and to protrude above the water level plus the height required to extend above the lowest point of the surrounding canal banks, each of the plurality of portable modular sections being installed such that each portable modular section is in close proximity to a canal bank or to an adjoining portable modular section, such that one assembly of portable modular sections, hereafter referred to as a bulkhead, bifurcates the canal upstream of the section to be isolated and such that another assembly of portable modular sections, hereafter referred to as a bulkhead, bifurcates the canal downstream of the section to be isolated; and
   (c) providing a plurality of pipelines whose length extends from the upstream bulkhead to the downstream bulkhead; and providing a plurality of pipelines of shorter length; and
   (d) placing the plurality of pipelines within the canal; and
   (e) attaching the pipelines to the bulkheads; and
   (f) operating the gates whereby the flow of water will be diverted into the pipelines bypassing the section to be lined; and
   (g) after the section is lined, operating the gates diverting said flow of water into the lined section; and
   (h) removing and repositioning the bulkheads and pipelines to the succeeding section of the canal to be isolated.

2. The method of claim 1 further comprising the step of sealing each portable modular section to the adjoining portable modular section and canal bottom with a flexible seal.

3. The method of claim 1 wherein said bulkhead is assembled in its entirety and installed as a unit in the canal.

4. The method of claim 3 further comprising of installing the bulkhead in existing structures in the canal.

5. The method of claim 4 further comprising the step of sealing each portable modular section to the adjoining portable modular section and existing structure with a flexible seal.

6. The method of claim 1 wherein said bulkhead is assembled in its entirety; and said pipeline is attached; and bulkhead and pipeline are installed together as a unit in the canal.

7. The method of claim 6 further comprising of installing the bulkhead and pipeline as a unit in existing structures in the canal.

8. The method of claim 7 further comprising the step of sealing the bulkhead and canal bottom with a flexible seal.

9. A method for bypassing the flow of water in an earthen canal to successively isolate and line distinct sections of the canal comprising the steps of:
   (a) forming a plurality of portable modular sections by a method comprising the following steps:
      (i) providing a plurality of generally vertical walls and a plurality of gates;
      (ii) attaching a plurality of gates to each vertical wall; and (iii) assembling one or more generally vertical walls together in such a manner as to form a portable modular section; and (b) lowering the water level in the canal; and (c) installing each portable modular section at individual predetermined locations in the canal, the generally vertical walls of each portable modular section having been chosen so as to have sufficient height to extend down to sufficient depth to provide a water tight seal and to protrude above the water level plus the height required to extend above the lowest point of the surrounding canal banks, each of the plurality of portable modular sections being installed such that each portable modular section is in close proximity to a canal bank or to an adjoining portable modular section, such that one assembly of portable modular sections, hereafter referred to as a bulkhead, bifurcates the canal upstream of the section to be isolated and such that another assembly of portable modular sections, hereafter referred to as a bulkhead, bifurcates the canal downstream of the section to be isolated; and (d) providing a plurality of pipelines whose length extends from the upstream bulkhead to the downstream bulkhead; and providing a plurality of pipelines of shorter length; and (e) placing the plurality of pipelines within the canal; and (f) attaching the pipelines to the bulkheads in such a manner so as to form a water tight connection; and (g) bracing the pipeline within the canal; and (h) raising water levels in the canal; and (i) operating the gates whereby said flow of water will be diverted into the pipelines bypassing the section to be lined; and (j) after the section is lined, operating the gates diverting said flow of water into the lined section; and (k) removing and repositioning the bulkheads and pipelines to the succeeding section of the canal to be isolated.

10. The method of claim 9 wherein the gate comprises of sheet piling driven into place in close proximity to the bulkhead.

11. The method of claim 9 further comprising the step of sealing each portable modular section to the adjoining portable modular section and canal bottom with a flexible seal.

12. The method of claim 9 wherein said bulkhead is assembled in its entirety and installed as a unit in the canal.

13. The method of claim 12 further comprising of installing the bulkhead in existing structures in the canal.

14. The method of claim 13 further comprising the step of sealing each portable modular section to the adjoining portable modular section and existing structure with a flexible seal.

15. The method of claim 9 wherein said bulkhead is assembled in its entirety; said pipeline is attached, and bulkhead and pipeline are installed together as a unit in the canal.

16. The method of claim 15 further comprising of installing the bulkhead and pipeline as a unit in existing structures in the canal.

17. The method of claim 16 further comprising the step of sealing the bulkhead and existing structure with a flexible seal.

18. A method for bypassing the flow of water in an earthen canal to successively isolate and line distinct sections of the canal comprising the steps of (a) lowering the water level in the canal; and (b) providing a plurality of pipelines whose length extends the length of the section to be isolated; and providing a plurality of pipelines of shorter length; and providing a plurality of gates; and (c) placing a plurality of pipelines at individual predetermined locations within the canal; and (d) placing a plurality of earthen embankments about the pipelines so as to have sufficient height to protrude above the water level plus the height required to extend above the lowest point of the surrounding canal banks, such that one embankment, hereafter referred to as an earthen bulkhead, which bifurcates the canal upstream of the section to be isolated and such that another embankment, hereafter referred to as an earthen bulkhead, which bifurcates the canal downstream of the section to be isolated; and (e) bracing the pipelines within the canal; and (f) attaching the gates to the pipelines; and (g) raising water levels in the canal; and (h) operating the gates whereby said flow of water will be diverted into the pipelines bypassing a section to be lined; and (i) after the section is lined, operating the gates diverting said flow of water into the lined section; and (j) removing the earthen bulkhead, and removing and repositioning the pipelines to the succeeding section of the canal to be isolated.

19. The method of claim 18 where the gate comprises of sheet piling driven into place in close proximity to the earthen bulkhead.

20. The method of claim 18 further comprising of installing the earthen bulkhead in existing structures in the canal.

* * * * *